US006855796B2

(12) United States Patent
Lachowicz et al.

(10) Patent No.: US 6,855,796 B2
(45) Date of Patent: Feb. 15, 2005

(54) CURABLE RESIN COMPOSITIONS AND PROCESS FOR PREPARING OLIGOMERS AND POLYMERS HAVING ACRYLOYL GROUPS, SUBSTITUTED METHACRYLATE GROUPS AND β-DICARBONYL GROUPS

(75) Inventors: Artur Lachowicz, Berlin (DE); Kai-Uwe Gaudl, Hohen Neuendorf (DE); Gerwald Grahe, Berlin (DE)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/322,751

(22) Filed: Dec. 19, 2002

(65) Prior Publication Data

US 2003/0195317 A1 Oct. 16, 2003

(30) Foreign Application Priority Data

Dec. 21, 2001 (DE) .......................... 101 63 433

(51) Int. Cl.$^7$ ................................. C08G 6/00
(52) U.S. Cl. ................. 528/220; 525/471; 525/539; 529/312; 529/328; 529/229
(58) Field of Search .................. 528/220; 525/471, 525/539; 526/312, 328, 229; 560/178, 183, 205

(56) References Cited

U.S. PATENT DOCUMENTS

| | | | |
|---|---|---|---|
| 2,675,372 A | | 4/1954 | Coover et al. |
| 5,945,489 A | * | 8/1999 | Moy et al. .................. 525/471 |
| 6,025,410 A | * | 2/2000 | Moy et al. .................. 522/182 |
| 6,673,851 B2 | * | 1/2004 | Moy et al. .................. 522/173 |
| 2003/0073757 A1 | * | 4/2003 | Moy et al. .................. 522/176 |

FOREIGN PATENT DOCUMENTS

WO          WO 01/00684 A1          1/2001

OTHER PUBLICATIONS

Clemens RJ et al. "*A Comparison of Catalysts for Crosslinking Acetoacetylated Resins Via the Michael Reaction*" JCT. Journal of Coatings Technology vol.51, No. 770, Mar. 1, 1989, pp. 83–91.

* cited by examiner

Primary Examiner—Tatyana Zalukaeva
(74) Attorney, Agent, or Firm—Armstrong, Kratz, Quintos, Hanson & Brooks, LLP

(57) ABSTRACT

A curable resin composition which exhibits no drawbacks such as yellowing and exhibits excellent hydrolysis sensitivity is provided, and a process for preparing curable oligomers and polymers which has foregoing properties is provided. The composition comprises a curable oligomer or polymer, wherein the oligomer or polymer has an acryloyl group, a β-dicarbonyl group having a chemical structure part represented by any of the following structures,

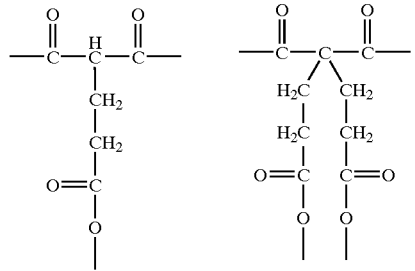

and a substituted methacrylate group represented by the following structure:

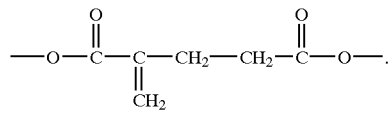

6 Claims, No Drawings

CURABLE RESIN COMPOSITIONS AND PROCESS FOR PREPARING OLIGOMERS AND POLYMERS HAVING ACRYLOYL GROUPS, SUBSTITUTED METHACRYLATE GROUPS AND β-DICARBONYL GROUPS

BACKGROUND OF THE INVENTION

1. Field of the Invention

The invention relates to curable resin compositions comprising oligomers and polymers having acryloyl groups, substituted methacrylate groups and β-dicarbonyl groups. The oligomers and polymers invention are useful as binders in UV-curable and thermosetting inks and coatings.

2. Description of Related Art

Resins, containing acryloyl groups are widely used in coating industry, as for example as coating materials for paper, wood, metal and plastic, in printing inks, adhesives and sealants. The crosslinking, which includes curing or hardening, is achieved by polymerization of the acryloyl groups with electron beam or with the help of a radical initiator. Furthermore, acrylates are able to crosslink with other reactive resins, such as unsaturated polyesters, polyacetoacetates or polyamines.

The backbone of such curable systems is an acrylated oligomer or polymer, which is then later, in the cured coating or ink, responsible for hardness, toughness, solvent resistance, adhesion and so on. In the U.S. Pat. No. 5,945,489 the inventors describe such acrylated oligomers and polymers, which have acrylated groups and which are prepared by Michael addition of β-dicarbonyl compounds and excess of multifunctional acrylated monomers. The Michael addition of β-dicarbonyl compounds and acrylates requires a strong basic catalyst, having a pk of >12, such as organic amidines or inorganic bases (Organikum, V E B Deutscher Verlag der Wissenschaften, 16th edition, Berlin 1986, page 509–510). The disadvantage of this process is that the strong basic catalyst remains in the product after the production as well as in the cured coating or ink and may cause problems. It is a matter of common knowledge, that for examples strong amines may cause yellowing. Another drawback of coatings, derived from acetoacetates, acrylates and strong amines such as amidines, is their hydrolysis sensitivity. This is also described in literature (Journal of Coatings Technology, Vol. 61, No. 770, März 1989, Page 89). The authors attribute this to the high basisity of the amines, which remain in the cured product and promote ester hydrolysis in the presence of humidity. Amines having lower pk of about 10 are not suitable for the Michael addition of acrylates and β-dicarbonyl compounds. Inorganic bases such as potassium hydroxide, which can be used as well should even increase the hydrolysis sensitivity. The neutralization of the bases is often difficult, as the formed salts precipitate from the curable mixture or may "bloom out" from the cured coating.

BRIEF SUMMARY OF THE INVENTION

It is therefore an object of the invention to provide a curable resin composition which exhibits no drawbacks such as yellowing and exhibits excellent hydrolysis sensitivity as well, and also a process for preparing curable oligomers and polymers which has foregoing properties.

Accordingly, the present invention provides a curable resin composition comprising a curable oligomer or polymer, wherein the oligomer or polymer has an acryloyl group, a β-dicarbonyl group having a chemical structure part represented by any of the following structures:

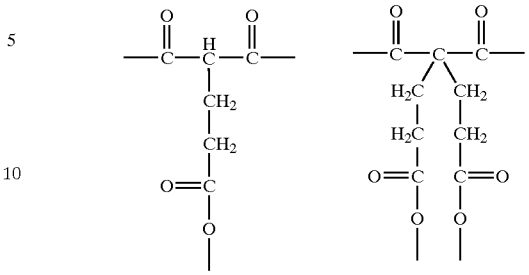

and a substituted methacrylate group represented by the following structure:

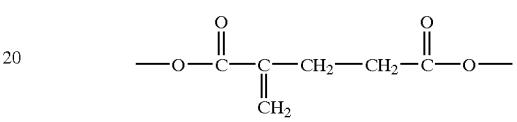

The present invention also provides a process for preparing a curable oligomer or polymer, having an acryloyl group, a β-dicarbonyl group having a chemical structure part represented by any of the following structures:

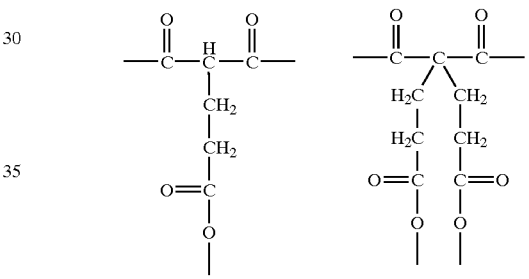

and a substituted methacrylate group represented by the following structure:

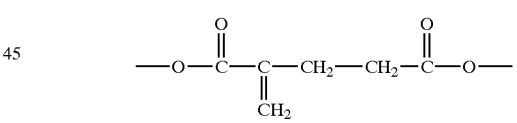

comprising a reaction step of reacting at least one multifunctional monomeric acrylate with at least one compound having at least one β-dicarbonyl group in the presence of a tertiary organic phosphine.

DETAILED DESCRIPTION OF THE INVENTION

The aforementioned drawbacks of hydrolysis and yellowing were hurdled by using tertiary phosphine catalysts for the preparation of acrylated resins, prepared from acrylates and β-dicarbonyl compounds such as acetoacetates, malonates and β-diketones via Michael addition. Due to the very low pk of the tertiary phosphines (pk~3–6), these catalysts are not able to promote ester hydrolysis in the cured coating or ink. A discoloration or yellowing was not observed as the decomposition products of the phosphines, the phosphine oxides, are colorless and inert compounds, whereas the oxidation products of amine catalysts are often colored and therefore responsible for yellowing in the coating.

Further, in course of the experiments, it was observed, that the acrylated oligomers and polymers prepared from acrylates and β-dicarbonyl compounds in the presence of tertiary phosphines also have a certain amount of substituted methacrylate groups which is responsible for excellent hydrolysis sensitivity.

Consequently, they differ also in structure from such oligomers and polymers, prepared from acrylates and β-dicarbonyl compounds in the presence of strong bases. They represent new materials and are termed hereinafter also as the oligomers and polymers of this invention.

Multifunctional monomeric acrylates, which are useful for the preparation of the oligomers and polymers of this invention are for example 1,4-butandiol diacrylate, 1,6-hexandiol diacrylate, dipropylenglycol diacrylate, neopentylglycol diacrylate, ethoxylated neopentylglycol diacrylate, propoxylated neopentylglycol diacrylate, tripropylene glycol diacrylate, bisphenol-A diacrylate, ethoxylated bisphenol-A diacrylate, poly(ethylene)glycol diacrylate, trimethylolpropane triacrylate, ethoxylated trimethylolpropane triacrylate, propoxylated trimethylolpropane triacrylate, propoxylated glycerol triacrylate, tris(2-hydroxyethyl)isocyanurate triacrylate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate, dipentaerythritol hexaacrylate or mixtures thereof.

Suitable β-dicarbonyl compounds, including β-diketones, β-keto esters and malonates, which are useful for the preparation of the oligomers and polymers of this invention are for example pentane-2,4-dione, hexane-2,4-dione, heptane-2,4-dione, 1-methoxy-2,4-pentanedione, 1-phenyl-1,3-butanedione, 1,3-diphenyl-1,3-propanedione, benzoylacetic acid methyl ester, benzoylacetic acid ethyl ester, benzoylacetic acid butyl ester, propionylacetic acid ethyl ester, propionylacetic acid butyl ester, butyrylacetic acid methyl ester, acetoacetic acid methyl ester, acetoacetic acid ethyl ester, acetoacetic acid isopropyl ester, acetoacetic acid butyl ester, acetoacetic acid tert.-butyl ester, acetoacetic acid-(2-methoxyethyl) ester, acetoacetic acid-(2-ethylhexyl) ester, acetoacetic acid lauryl ester, 2-acetoacetoxyethyl acrylate, 2-acetoacetoxyethyl methacrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, ethoxylated bisphenol A diacetoacetate, trimethylolpropane triacetoacetate, glycerol triacetoacetate, pentaerythritol triacetoacetate, pentaerythritol tetraacetoacetate, ditrimethylolpropane tetraacetoacetate, dipentaerythritol hexaacetoacetate, acetoacetate group-containing oligomers and polymers obtained by transesterification of acetoacetic acid ethyl esters with oligomeric or polymeric polyols, and acetoacetate group-containing oligomers and polymers obtained by copolymerisation of 2-acetoacetoxyethyl methacrylate, malonic acid dimethylester, malonic acid diethylester, malonic acid dipropylester, malonic acid diisopropylester, malonic acid dibutylester, malonic acid di(2-ethylhexylester), malonic acid dilaurylester, oligomers and polymers obtained by of dialkyl malonates and diols. Particularly suitable are benzoylacetic acid ethyl ester, acetoacetic acid methyl ester, acetoacetic acid ethyl ester, malonic acid dimethylester, malonic acid diethylester, phenyl-1,3-butanedione and pentane-2,4-dione, 1,3-diphenyl-1,3-propanedione and polymeric diacetoacetates that have been produced by transesterification of unsaturated polyester diols with ethyl acetoacetate or mixtures thereof.

Tertiary organic phosphine catalysts, which are useful for the preparation of the oligomers and polymers of this invention are for example tripropylphosphine, triisopropylphosphine, trivinylphosphine, tributylphosphine, triisobutylphosphine, tri-tert.-butylphosphine, triallylphosphine, tris(2,4,4-trimethylpentyl)phosphine, tricyclopentylphosphine, tricyclohexylphosphine, cyclohexyldiphenylphosphine, dicyclohexylphenylphosphine, triphenylphosphine, tri-n-octylphosphine, tri-n-dodecylphosphine, tribenzylphosphine, dimethylphenylphosphine, 1,2-bis(diphenylphosphino)ethane, 1,3-bis(diphenylphosphino)propane, 1,4-bis(diphenyl-phosphino)butane, tertiary arylphosphines, activated by the electron donating groups —OR oder —NR$_2$ (R=H, C$_1$–C$_{12}$-alkyl, C$_1$–C$_{12}$-aryl) as for example diphenyl(2-methoxphenyl)phosphine, tris(4-methoxyphenyl)phosphine, tris(2,6-dimethoxyphenyl)phosphine, tris(4-dimethylaminophenyl)phosphine, tertiary alkylphosphines, containing phosphorous bound hetero atoms as for example hexamethylenetriaminophosphine and hexaethylenetriaminophosphine.

Preferred among the above-exemplified tertiary organic phosphine catalysts are tiralkylphosphines having C5–10 alkyl groups in the scope of yellowing and hydrolysis sensitivity of their products.

The preparation of the oligomers and polymers of this invention is carried out by mixing β-dicarbonyl compounds, tertiary phosphine catalysts and an excess of acrylates at room temperature or elevated temperatures. The amount of added phosphine catalyst is 0.2–10 weight %, preferred 0.5–1.5 weight % of the total mixture.

The ratio of acryloyl groups and β-dicarbonyl groups may be varied over a wide range. The excess of acryloyl groups is 100–2000%. It is here the reponsibility of a person skilled in the art to determine a suitable ratio of acryloyl groups, β-diacrbonyl groups and amount of phosphine catalyst, which lead to the target properties of the desired curable system as well as to the properties of the cured product. As a rule of thumb, the higher the functionality of the compounds, having β-dicarbonyl groups, the higher the required excess of acryloyl groups, in order to obtain a soluble product.

In a preferred embodiment for the preparation of larger quantities of the oligomers and polymers of this invention, the organic phosphine catalysts are dissolved in the component containing β-dicarbonyl groups and this solution is then added to the compounds having acryloyl groups. In order to complete the reaction, which is necessary for good storage stability, the reaction mixture may be kept several hours at a reaction temperature of 50–90° C.

With regard to the reaction conditions, the ratio of acryloyl groups to β-dicarbonyl groups, the amount of catalyst and reaction temperature are selected so as to cover a viscosity range of 250–100000 mPas and a range of average molecuar weight of 500–15000 in their oligomers and polymers. This enables applications of curable mixtures designed for low viscosity, such as overprint varnishes, as well as the use in high viscosity curable products, such as UV-curable paste inks.

In contrast to the products described in U.S. specification Pat. No. 5,945,489, the average molecular weight and viscosity of oligomers and polymers of this invention, also depends on the amount of phosphine catalyst. In the following comparison experiment, a test mixture of 1.05 g (9.0 mmol) methyl acetoacetate and 9.00 g (30 mmol) trimethylolpropane triacrylate was treated with two different amounts of phosphine catalyst and amine catalyst. In the amine catalyzed product the viscosity and the average molecular weight remain the same with both amine concentrations, whereas the phosphine catalysed product show increased molecular weight and viscosity with increased amount of phosphine catalyst.

| Tri-n-octylphoshine g/(mmol) | 1,8-Diazabicyclo(5.4.0) undec-7-ene g/(mmol) | Viscosity mPas | Molecular weight Mw |
|---|---|---|---|
| 0.05/(0.135) | — | 9000 | 2600 |
| — | 0.0205/(0.135) | 4600 | 1900 |
| 0.10/(0.27) | — | 11,200 | 3200 |
| — | 0.041/(0.27) | 4600 | 1900 |

Viscosity in milliPascalseconds at 25° C. after the reaction

This unexpected result gave rise to investigate the formed oligomers and polymers which were prepared in the presence of tertiary phosphine catalysts. Analytical measurements revealed that two reactions proceed parallel, which both contribute to the formation of the oligomers and polymers of this invention. The first reaction is, as expected, the Michael addition of the acrylate group and a β-dicarbonyl group depicted in the following reaction scheme.

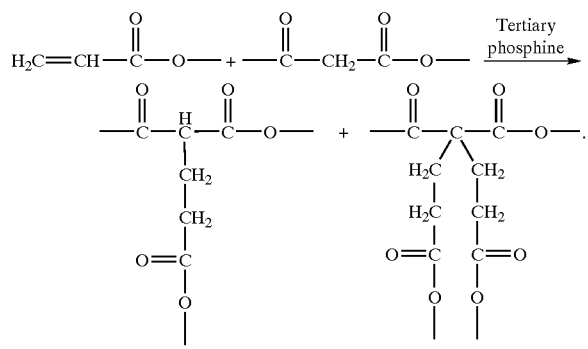

In the second reaction, acryloyl groups react with each other in the presence of tertiary phosphines, which also contributes to the formation of the oligomers and polymers of this invention resulting in an additional increase in molecular weight.

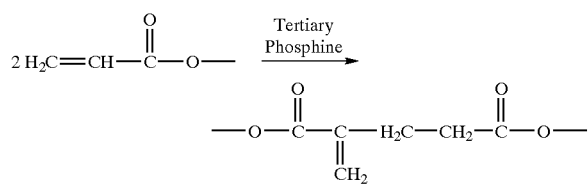

The prove of the aforementioned structures was achieved by $^1$proton- and $^{13}$carbon nuclear magnetic resonance spectroscopy. The allocation of atoms to the chemical shifts was done with the help of model compounds. The table, which is given below, shows the allocation of the chemical shifts to their corresponding carbon atoms of an oligomer derived from 1,4-butanediol diacrylate and methyl acetoacetate in the presence of tri-n-octyl phosphine.

| Structure | Group | Chemical shift |
|---|---|---|
| (1) (2) H$_2$C=CH—C(=O)—O— | Acrylate | 130 ppm (1), 128 ppm (2) |
| —O—C(=O)—C(=CH$_2$)(3)(5)—H$_2$C— (4) | substituted Methacrylate | 139 ppm (3), 126 ppm (4), 28 ppm (5) |
| —C(=O)—C(6)H—C(=O)—O— | monosubstituted Acetoacetate | 52 ppm (6) |
| —C(=O)—C(7)—C(=O)—O— | disubstituted Acetoacetate | 60 ppm (7) |

In the oligomers and polymers prepared in the presence of amine catalysts, the signals (3), (4) and (5), which represent the substituted methacrylate structure, are absent. This result confirms as well, that the oligomers and polymers of this invention prepared in the presence of organic tertiary phosphines, differ also in structure from such products prepared with amines as catalysts and represent therefore new compounds.

The curable resin composition of the invention comprises the foregoing oligomers or polymers as essential components and does not always need an initiator for their curing, because the oligomers or polymers have good self-closslinking ability by electron beam or UV radiation. Even if cured without any initiators, good harden products can be obtained, which may be used for solvent resistant coatings.

However, using initiators is more preferable for curing the oligomers or polymers. Namely the compositions of the invention further contain an initiator.

As the initiator, there may be used any initiators such as a free radical photo initiator for example peroxo- or azo-initiators or a photo initiator.

A preferred curing method is the crosslinking by electron beam or UV radiation. In the latter method, photo initiators are dissolved in the oligomers and polymers of this invention.

The amount of added photo initiator is within the range of 0.5 to 13 weight %, preferred 2–7 weight %. Suitable photo initiators are for example benzophenone, methylbenzophenone, 4-phenylbenzophenone, 4,4'-bis (dimethylamino)-benzophenone, 4,4'-bis (diethylamino)-benzophenone, 2,2-dimethoxy-2-phenylacetophenone, dimethoxyacetophenone, diethoxyacetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenylacylphenyl phosphinoxide, diphenyl (2,4,6-trimethylbenzoyl) phosphinoxide, 2,4,6-trimethylbenzoylethoxyphenyl phosphinoxide, 2-isopropylthioxantone, 4-Isopropylthioxanthone, 2,4-dimethylthioxanthone.

If desired, other resins or compounds having reactive groups, which are able to react with the acrylate and methacrylate groups in the the oligomers and polymers, can be incorporated in the curable resin composition of the invention. As the other resins or compounds having reactive groups, there can be mentioned, for example, amines, unsaturated polyesters, or β-dicarbonyl compounds such as malonates, and acetoacetates.

For hardening, the products according to the invention were applied on top of suitable substrates such as for example paper, polyethylene, polypropylene, polyester, polyvinylidene chloride, aluminium, steel or wood and hardened under UV irradiation. Commercially available mercury high-pressure radiators or microwave-excited radiators without electrodes may be used for the hardening.

The oligomers and polymers may be used as prepared or, if necessary, diluted with commercially availble acrylate monomers in order to obtain the target viscosity for the intended viscosity. For example, the target viscosity for an overprint varnish of 5–20 micron, applied by a roller coater, may be 150–400 milliPascal seconds.

The following table shows the compositions of various—ready to use—UV-curable mixtures, containing oligomers and polymers of this invention from the examples.

Cured coatings of the oligomers and polymers of this invention were examined after the hardening with UV radiation using various lead pencils, and the solvent resistance was checked with methyl ethyl ketone (MEK).

Furthermore, the oligomers and polymers of this invention be cured under an inert atomsphere by high energy electron beam of 150–450 keV, generated in a scanning or linear accelerator.

The products cured by UV-light or electron beam, which contain the oligomers and polymers show in general good hydrolysis stability.

The testing of the hydrolysis stability was performed as described by the following procedure. One of two identical test mixture of trimethylolpropane triacrylate (TMPTA) and methyl acetoacetate was mixed with DBU (1,8-diazabicyclo (5.4.0)-undec-7-ene) and the other with TOP( trioctyl phosphine). After the reaction, the mixtures were adjusted with tripropylene glycol diacrylate (TPGDA) so that they had the same viscosity. The composition are also embodied in the following table.

|  | Mixture 1 | Mixture 2 |
|---|---|---|
| Composition: | 9.00 g TMPTA<br>1.10 g methyl | 9.00 g TMPTA<br>1.10 g methyl |

| System | Mixture |  | [4]Viscosity | [1]Radiation Intensity | [2]Solvent Resistance | [3]Pencil-Hardness |
|---|---|---|---|---|---|---|
| 1 | Product of Example 30<br>[5]TPGDA<br>Benzophenone/[7]MDEA<br>(1:1 molar) | 56.0%<br>35.0%<br>9.0% | 240 mPas | 0.275 J/cm²<br>0.550 J/cm² | >75 DH<br>>75 DH | 4H<br>6H |
| 2 | Product of Example 30<br>TPGDA<br>[8]Irgacure 1000 | 59.0%<br>35.0%<br>6.0% | 280 mPas | 0.275 J/cm²<br>0.550 J/cm² | >75 DH<br>>75 DH | 2H<br>6H |
| 3 | Product of Example 30<br>TPGDA<br>[9]Darocur 4265 | 59.0%<br>35.0%<br>6.0% | 310 mPas | 0.275 J/cm²<br>0.550 J/cm² | >75 DH<br>>75 DH | 3H<br>5H |
| 4 | Product of Example 30<br>TPGDA[5]<br>[6]EPAC<br>Benzophenone/MDEA<br>(1:1 molar) | 39.0%<br>36.0%<br>16.0%<br>9.0% | 390 mPas | 0.275 J/cm²<br>0.550 J/cm² | >75 DH<br>>75 DH | 4H<br>5H |
| 5 | Product of Example 30<br>TPGDA<br>EPAC<br>Irgacure 1000 | 40.0%<br>38.0%<br>16.0%<br>6.0% | 410 mPas | 0.275 J/cm²<br>0.550 J/cm² | >75 DH<br>>75 DH | 2H<br>4H |
| 6 | Product of Example 30<br>TPGDA<br>EPAC<br>Darocur 4265 | 40.0%<br>38.0%<br>16.0%<br>6.0% | 410 mPas | 0.275 J/cm²<br>0.550 J/cm² | >75 DH<br>>75 DH | 2H<br>4H |
| 7 | Product of Example 31<br>TPGDA<br>[10]Irgacure 184 | 68.0%<br>27.0%<br>5.0% | 510 mPas | 0.275 J/cm²<br>0.550 J/cm² | >75 DH<br>>75 DH | 4H<br>4H |
| 8 | Product of Example 31<br>TPGDA<br>[11]Acrylated Amine<br>Benzophenone<br>MDEA | 61.0%<br>27.0%<br>4.0%<br>5.0%<br>3.0% | 420 mPas | 0.275 J/cm²<br>0.550 J/cm² | >75 DH<br>>75 DH | 4H<br>5H |

[1]Radiated amount of light for crosslinking with an F 300H bulb (total UV A, B, C) measured with a radiometer from the EIT company.
[2]Solvent resistance of the hardened film, tested by repeated rubbing of the film surface with a woodpulp cloth impregnated with methyl ethyl ketone (MEK). The number of rubbings that still did not produce any visible damage to the coating was measured.
[3]Lead pencil hardness after the hardening, at which the film exhibits the first visible signs of damage.
[4]Viscosity prior application
[5]Tripropylene glycol diacrylate,
[6]bisphenol-A-diglycidylether diacrylate,
[7]N-methyldiethanolamine,
[8,9,10]Trademarks of CIBA.
[11]Product from ethanolamine and 1,6-hexandiol diacrylate (1:2).

-continued

|  | Mixture 1 | Mixture 2 |
|---|---|---|
| Reactive diluent: | acetoacetate 0.20 g TOP 4.00 g TPGDA | acetoacetate 0.20 g DBU 4.70 TPGDA |
| Viscosity: | 400 mPas | 405 mPas |
| Coating thickness: | 15 μm | 15 μm |
| UV-curing speed: | 16 meter/minute | 16 meter/minute |

The mixtures were applied on aluminum specimen and cured under UV-light in the presence of 4% 2-hydroxy-2-methyl-1-phenylpropan-1-one.

Then, the coatings were immersed for 2 hours in boiling water. Then, the coatings were peeled off from the substrate, dried and placed on an ATR crystall in an infrared spectrometer. The coatings prepared with DBU, showed an decrease in transmission at 3400–3600 $cm^{-1}$, which can be interpreted with an increase of carboxyl groups and hydroxyl groups due to hydrolysis.

Another example for the application of the oligomers and polymers is the crosslinking in a Michael addition with compounds having active hydrogens such as β-dicarbonyl groups. In this application, β-dicarbonyl compounds can be incorporated in the curable resin compositions. As the β-dicarbonyl compounds, there can be mentioned, for example, acetoacetates and malonates.

| System | Composition | g | Solvent resistance | Pencil-hardness |
|---|---|---|---|---|
| 1 | Product of example 31 | 6.00 | >75 | 4H |
|  | Bisacetoacetate, obtained from methyl | 4.00 |  |  |
|  | acetoacetate and 2-ethyl-2-butylpropandiol | 0.30 |  |  |
|  | *TOP |  |  |  |
| 2 | Product of example 31 | 6.00 | >75 | 4H |
|  | Polymalonate, obtained from dimethylmalonate and triethylene glycol | 6.00 |  |  |
|  | TOP | 0.25 |  |  |

*TOP = trioctyl phosphine

Another example for the use of the oligomers and polymers is the curing with unsaturated polyesters. The oligomers and polymers are mixed with the unsaturated polyester and an initiator mixture is added. In the present examples the initiator mixture contains a peroxide and a metal salt coinitiator. The following table gives two examples of the curing of the oligomers of this invention together with unsaturated polyesters.

| System | Composition | g | Solvent resistance | Pencil-hardness |
|---|---|---|---|---|
| 1 | Polylite CN 610* (unsaturated polyester, dissolved in 40% styrene) | 7.00 | >75** | 4H** |
|  | Product of example 31 | 4.00 |  |  |
|  | 2-Butanone peroxide | 0.10 |  |  |
|  | OctaSoligen Cobalt 6 | 0.05 |  |  |
| 2 | Polylite CN 450* (unsaturated polyester, dissolved in 2-hydroxyethylacrylate) | 6.00 | >75** | 4H** |
|  | Product of example 31 | 5.00 |  |  |
|  | 2-Butanone peroxide | 0.10 |  |  |
|  | OctaSoligen Cobalt 6 | 0.05 |  |  |

*Products of DIC, Japan
**after 72 hours, coating thickness approximately 80 μm

Objects and advantages of this invention are further illustrated by the following examples, but the particular materials and amounts thereof recited in these examples, as well as other conditions and details should not be construed to limit this invention.

EXAMPLES

Example 1–29

General Procedure

The phosphine catalyst is dissolved in the compound, having β-dicarbonyl groups. Then, the compound having the acryloyl groups is added under stirring at room temperature. An exothermic reaction starts, which fades away after 15–30 minutes. The mixture is then allowed to cool down to room temperature.

Example 1–16

Products from trimethylolpropane triacrylate and methyl acetoacetate

| Example | TMPTA[1] (g) | DMM[3] (g) | TOP[2] (g) | Molecular weight (Mn/Mw) | Viscosity (mPas) | Yellowing |
|---|---|---|---|---|---|---|
| 1 | 9.00 | 0.706 | 0.025 | 800/n.d. | 240 | Nothing |
| 2 | 9.00 | 1.06 | 0.025 | 835/n.d. | 280 | Nothing |
| 3 | 9.00 | 1.416 | 0.025 | 760/n.d. | 100 | Nothing |
| 4 | 9.00 | 1.888 | 0.025 | 760/n.d. | 70 | Nothing |
| 5 | 9.00 | 0.706 | 0.05 | 1100/n.d. | 2200 | Nothing |
| 6 | 9.00 | 1.06 | 0.05 | 1280/n.d. | 2800 | Nothing |
| 7 | 9.00 | 1.416 | 0.05 | 1460/3790 | 2800 | Nothing |
| 8 | 9.00 | 1.888 | 0.05 | 1635/3904 | 2800 | Nothing |
| 9 | 9.00 | 0.706 | 0.10 | 1669/4100 | 4200 | Nothing |
| 10 | 9.00 | 1.06 | 0.10 | 1421/3272 | 11200 | Nothing |
| 11 | 9.00 | 1.416 | 0.10 | 1757/5500 | 33000 | Nothing |
| 12 | 9.00 | 1.888 | 0.10 | 2004/7446 | 84000 | Nothing |
| 13 | 9.00 | 0.706 | 0.20 | 1476/3490 | 25000 | Nothing |

-continued

| Example | TMPTA[1] (g) | DMM[3] (g) | TOP[2] (g) | Molecular weight (Mn/Mw) | Viscosity (mPas) | Yellowing |
|---|---|---|---|---|---|---|
| 14 | 9.00 | 1.06 | 0.20 | 1663/4875 | 79000 | Nothing |
| 15 | 9.00 | 1.416 | 0.20 | 2028/8655 | >100000 | Nothing |
| 16 | 9.00 | 1.888 | 0.20 | — | Gel | Nothing |

[1]trimethylolpropane triacrylate,
[2]tri-n-octylphoshine,
n.d. = not determined,
Mn = number average
Mw = weight average

Example 17–29

Products from trimethylolpropane triacrylate and dimethyl malonate

| Example | TMPTA[1] (g) | DMM[2] (g) | TOP[3] (g) | Molecular weight Mn/Mw | Viscosity (mPas) | Yellowing |
|---|---|---|---|---|---|---|
| 17 | 9.00 | 0.792 | 0.025 | 650/760 | 150 | Nothing |
| 18 | 9.00 | 1.188 | 0.025 | 630/727 | 180 | Nothing |
| 19 | 9.00 | 1.884 | 0.025 | 640/780 | 150 | Nothing |
| 20 | 9.00 | 1.980 | 0.025 | 710/950 | 280 | Nothing |
| 21 | 9.00 | 0.792 | 0.05 | 980/1260 | 600 | Nothing |
| 22 | 9.00 | 1.188 | 0.05 | 770/1050 | 450 | Nothing |
| 23 | 9.00 | 1.884 | 0.05 | 780/1154 | 650 | Nothing |
| 24 | 9.00 | 1.980 | 0.05 | 720/990 | 400 | Nothing |
| 25 | 9.00 | 0.792 | 0.10 | 1069/1476 | 1400 | Nothing |
| 26 | 9.00 | 1.188 | 0.10 | 1180/1790 | 2700 | Nothing |
| 27 | 9.00 | 1.884 | 0.10 | 1020/1690 | 3200 | Nothing |
| 28 | 9.00 | 1.980 | 0.10 | 1080/2500 | 5200 | Nothing |
| 29 | 9.00 | 1.188 | 0.20 | 1456/2906 | 16000 | Nothing |

[1]trimethylolpropane triacrylate,
[2]tri-n-octylphoshine,
DMM = dimethyl malonate,
n.d. = not determined,
Mn = number average,
Mw = weight average

Example 30

45.0 g of trimethylolpropane triacrylate (viscosity: 90 mPas at 25° C.) was stirred at room temperature and treated with a solution of 5.0 g of methyl acetoacetate and 0.25 g of tri-n-octylphosphine. The solution was added dropwise within 5 minutes. The temperature raised to 40° C. Then, the reaction mixture was kept at 60° C. for 12 hours in order to complete the reaction. The obtained resin showed a viscosity of 1010 mPas at 25° C. Molecular number average Mn=1200.

Example 31

45.0 g of trimethylolpropane triacrylate was stirred at room temperature and treated with a solution of 5.0 g of methyl acetoacetate and 0.50 g of tri-n-octylphosphine. The solution was added dropwise within 5 minutes. The temperature raised to 45° C. after 10 minutes. Then, the reaction mixture was kept at 60° C. for 12 hours to complete the reaction. The obtained resin showed a viscosity of 6400 mPas at 25° C. Molecular number average Mn=1880.

Example 32

45.0 g of trimethylolpropane triacrylate was stirred at room temperature and treated with a solution of 5.0 g of methyl acetoacetate and 0.75 g of tri-n-octylphosphine. The solution was added dropwise within 5 minutes. The temperature raised to 60° C. Then, the reaction mixture was kept at 60° C. for 12 hours to complete the reaction. The obtained resin showed a viscosity of 18200 mPas at 25° C. Molecular number average Mn=3500.

Example 33

1.50 g of 2-butyl-2-ethyl-1,3-propanediol diacetoacetate

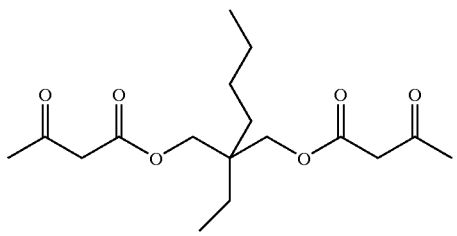

was dissolved in 8.5 g of trimethylolpropane triacrylate was stirred at room temperature and treated with 0.38 g of tri-n-butylphosphine. The slightly yellow colored reaction mixture reached a temperature of 45° C. and showed a viscosity of 22400 mPas at 25° C.

Example 34

1,50 g of tripropylene glycol diacetoacetate, obtained by transesterification of tripropylene glycol with ethyl acetoacetate, was dissolved in 8.5 g of tripropylene glycol diacrylate was stirred at room temperature and treated with 0.43 g of tri-n-dodecylphosphine. The slightly yellow colored reaction mixture reached a temperature of 47° C. and showed a viscosity of 12400 mPas at 25° C.

Example 35

1.90 g of a polymalonate, obtained by transesterification of dimethyl malonate and ethylene glycol

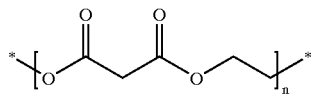

was dissolved in 10.0 g of tripropylene glycol diacrylate. Then, 0.38 g of tri-n-octylphosphine was added. After the exothermic reaction was complete, a curable resin was obtained, having a viscosity of 1220 mPas at 25° C.

Example 36

1.90 g of a polymalonate, obtained by transesterification of pentaerithitol with a 5-fold excess of dimethyl malonate and following removal of the excess of dimethyl malonate under reduced pressure, was dissolved in 10.0 g of tripropylene glycol diacrylate. Then, 0.38 g of tri-n-octylphosphine was added. After the exothermic reaction was complete, a curable resin was obtained, having a viscosity of 2300 mPas at 25° C.

Example 37

2.00 g of a polyacetoacetate, obtained by copolymerisation of 25% butyl acrylate, 25% styrene, 25% methyl methacrylate and 25% 2-acetoacetoxyethyl metharylate, was dissolved in 12.0 g of of tripropylene glycol diacrylate. Then, a total of 0.4 g of tri-n-dodecylphosphine was added in portions of 0.1 g. After the exothermic reaction was complete, a resin was obtained, having a viscosity of 1100 mPas at 25° C.

Example 38

148.0 g of phthalic anhydride was condensed with 130.0 g or ethylene glycol in the presence of 1.0 g of dibutyltin oxide at 200° C. At the time when 18.0 g of water was separated, the reaction temperature was lowered to 140° C. and 240.0 g of methyl acetoacetate were added. Within 4 hours at 140° C., 60.0 g of methanol was separated. To the intermediate product, 35.0 g of tri-n-octylphosphine was added at 80° C., followed by 1700.0 g of tripropylene glycol diacrylate. The diacrylate was added so that the temperature did not exceed 80° C. After the reaction was completed a UV-curable mixture, having a viscosity of 2500 mPas at 25° C., was obtained.

Example 39

225.0 g of trimethylolpropane triacrylate, 225.0 g of tripropylene glycol diacrylate, 95.0 g of ethyl acetoacetate and 0.25 g of 4-methoxyphenol were mixed and sparged with air. Then, 10.0 g of tri-n-octylphosphine was added and the mixture was gently warmed to 50° C. At that temperature, an exothermic reaction started, which increased the temperature of the reaction mixture to 80–90° C. At that time the viscosity of the mixture was 1200 mPas at 25° C. Now, the mixture was kept at 90–100° C. for about 3 hours, until the viscosity remained stable and did not further increase. Viscosity: 17000 mPas at 25° C. The viscosity of the product was adjusted with 225.0 g of tripropylene glycol diacrylate for better handling. End-viscosity: 1300 mPas at 25° C.

What is claimed is:

1. A curable resin composition comprising a curable oligomer or polymer, wherein the oligomer or polymer has an acryloyl group, a β-dicarbonyl group having a chemical structure part represented by any of the following structures:

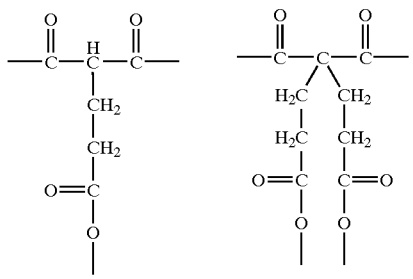

and a substituted methacrylate group represented by the following structure:

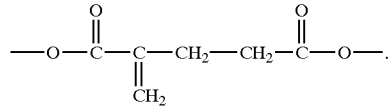

2. A curable resin composition according to claim 1, wherein the curable oligomer or polymer has a molecular weight of 300–15000 and a viscosity of 200–100000 mPas at 250° C.

3. A curable resin composition according to claim 1, wherein the composition further contains an initiator.

4. A curable resin composition according to claim 1, wherein the composition further contains an unsaturated polyester.

5. A curable resin composition according to claim 1, wherein the composition further contains a β-dicarbonyl compound.

6. A curable resin composition according to claim 1, wherein the oligomer or polymer is obtained by a process comprising a reaction step of reacting at least one multi-functional monomeric acrylate with at least one compound having at least one β-dicarbonyl group in the presence of a tertiary organic phosphine.

* * * * *